March 26, 1968 L. A. WORSHAM 3,375,020
STEERING GEAR STABILIZERS FOR KNEE-ACTION MOUNTED WHEELS
Filed June 10, 1966 2 Sheets-Sheet 1

INVENTOR.
LESTER A. WORSHAM,
BY
Berman, Davidson & Berman
ATTORNEYS.

March 26, 1968     L. A. WORSHAM     3,375,020
STEERING GEAR STABILIZERS FOR KNEE-ACTION MOUNTED WHEELS
Filed June 10, 1966     2 Sheets-Sheet 2
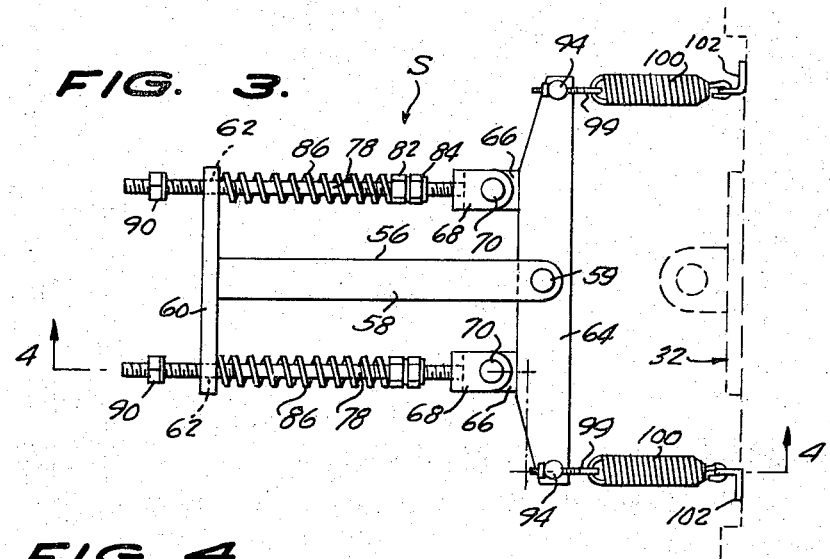
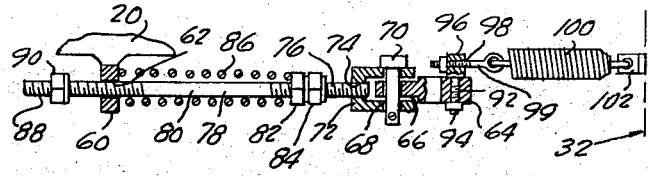
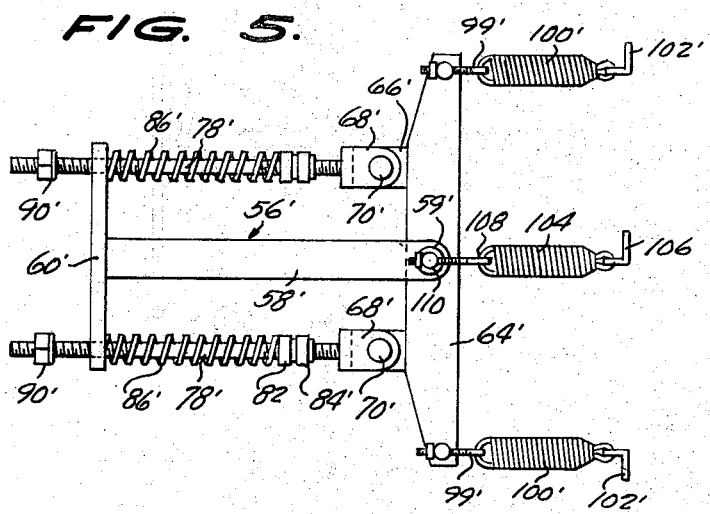
INVENTOR.
LESTER A. WORSHAM,
BY
Berman, Davidson & Berman
ATTORNEYS.

United States Patent Office 3,375,020
Patented Mar. 26, 1968

3,375,020
STEERING GEAR STABILIZERS FOR
KNEE-ACTION MOUNTED WHEELS
Lester A. Worsham, P.O. Box 559,
Cedartown, Ga. 30125
Filed June 10, 1966, Ser. No. 556,720
9 Claims. (Cl. 280—96.2)

ABSTRACT OF THE DISCLOSURE

For use with vehicles having a chassis with a cross member extending widthwise of and connected to said chassis, said cross member having a wheel backing member pivoted adjacent one end thereof for steering movement relative to said cross member; a stabilizer comprising a base member secured to said cross member inwardly from said wheel backing member and having at least a portion extending outwardly from the connection; an arm substantially medially pivoted to the outer end of said base member; rods pivoted adjacent the ends of said arm and slidably received in the inner end of said base member; compression springs on said rods mounted to resist tilting of said arms about said pivot and tension springs connecting said arm to said wheel backing member.

---

This invention relates to stabilizers for vehicle steering gear, of the type involving wheel steering knuckles, steering arms fixed to the knuckles, and drag links extending between and pivoted to the arms, in association with knee-action or other wheel suspensions.

The primary object of the invention is the provision of efficient, reliable, and fully adjustable devices of the kind indicated, which serve to relieve working pressures on the steering gears, and hence reduce wearing thereof, and which make for easier cornering, in steering a vehicle, and the return of the wheels, after cornering, to their normal straight ahead positions, despite the fluctuating actions of the associated knee-action wheel suspensions, and any worn conditions of their components.

Another object of the invention is the provision of devices of the character indicated above, the tensions of whose spring components are readily adjustable to overcome tendencies or leads of the wheels to either side of their normal straight-ahead positions, adjustable spring components being effectively located at the leading and trailing sides of the lower control arms of the knee-action wheel suspensions.

In the drawings:

FIGURE 3 is an enlarged plan view of a stabilizer shown in FIGURES 1 and 2;

FIGURE 4 is a longitudinal section, taken on the line 4—4 of FIGURE 3; and,

FIGURE 5 is a plan view of another form of stabilizer of the present invention.

Figure 1:
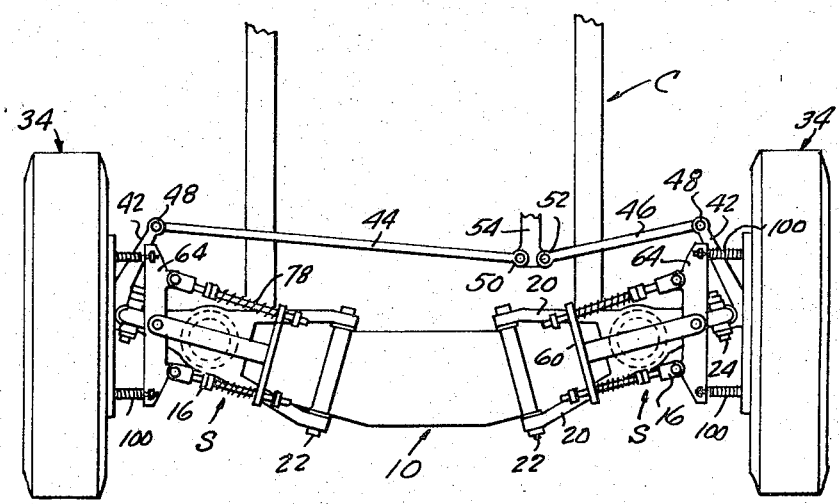
FIGURE 1 is a schematic bottom plan view of a knee-action vehicle wheel suspension, showing one form of stabilizers installed relative thereto.
Figure 2:
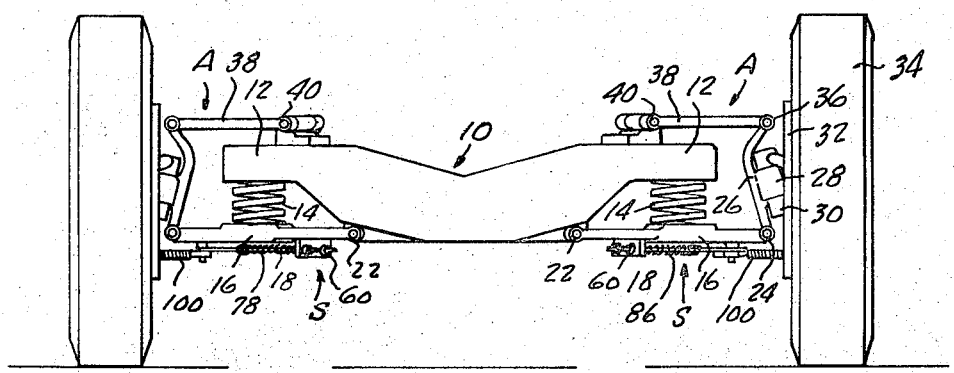
FIGURE 2 is a front end elevation of FIGURE 1.

Referring in detail to the drawings, and first to FIGURES 1 to 4, a vehicle chassis C is shown having a conventional steerable wheel suspension composed of a front cross member 10 having upset end portions 12, which cup the upper ends of the vertical coil springs 14, of knee-actions A. The lower ends of the springs 14 seat on normally horizontal plates 16, of lower springing arms 18, having spaced inwardly extending legs 20, which are pivoted, as indicated at 22, at their inner ends, to the underside of the chassis cross member 10. The plates 16 are pivoted, at their outer ends, as indicated at 24, to the lower ends of vertical arms 26, having lateral knuckles 28 engaged on king-pin assemblies 30, the latter being fixed on the inward sides of brake or wheel backing plates 32, having axles (not shown), on which steerable wheels 34 are mounted. The vertical arms 26 are pivoted, at their upper ends, as indicated at 36, to the outer ends of the upper knee-action springing arms 38, the last being pivoted, as indicated at 40, upon the tops of the upset end portions 12, of the cross member 10.

Associated with the knuckles 28 are fixed rearwardly extending steering arms 42, having drag links 44, 46 pivoted, at their outer ends, as indicated at 48, to the rear ends of the steering arms, these links being pivoted at their inner ends, as indicated at 50, 52, to a steering column shaft arm 54.

In accordance with the present invention, there is associated with each knee-action A, a stabilizer generally designated S, located beneath their lower springing arms 18 and articulated to the wheel backing plates 32. Each stabilizer S comprises a flat horizontal, T-shaped base member 56, having a standard portion 58 and a head 60. The head 60 is in a vertical plane at right angles to the standard portion 58 and is formed at its ends with holes 62.

The T-shaped members 56 are positioned beneath the lower springing arms 18 of the knee-actions, the heads 60 of these members being suitably fixed at their upper edges to and across the undersides of the legs 20 of the control arms the standard portions 58 extending spacedly beneath the plates 16 of the control arms in line with the centers thereof. At their outer or outboard ends, the standard portions 58 are traversed by pivot bolts 59 on which are centrally pivoted beneath the standard portions, flat longitudinal rock arms 64.

As shown in FIGURES 3 and 4, the rock arms have inwardly extending longitudinally spaced ears 66 equally spaced from the ends of the rock arms, over which are engaged clevises 68, the clevises and the ears being traversed by pivot pins 70. The clevises have vertical cross members 72, formed with threaded holes 74, through which are threaded, as indicated at 76, the outer ends of slide rods 78, which have smooth portions 80 sliding through the holes 62 of the standard portions 58 of the levers 56.

Threaded on the outer end portions 76, of the slide rods, are outer nuts 82 and lock nuts 84 engaged therewith. Coil springs 86 are circumposed on the slide rods 78 and are compressed between the nuts 82 and the heads 60. The slide rods have inner threaded end portions 88, on which are threaded inner stop nuts 90. The compression of the springs 86 is adjustable by threading the nuts 82 along the slide rods.

At their ends, the rock arms 64 have vertical bores 92, through which extend and turn anchor bolts 94, whose heads 96 are provided with horizontal bores 98, through which outwardly reaching eye-bolts 99 extend. The eye-bolts 99 are secured, at their outer ends, to the inner ends of contractile or tensional coil springs 100, which are connected, at their outer ends, to ears 102, suitably fixed to related spaced portions of the wheel backing plates 32.

In operation, as the wheel suspensions move up and down, in the course of travel of the associated vehicle over the ground, the contractile springs 100 alternately yield and contract, so as to provide yielding control of these movements, thereby reducing wear on their joints. As the wheels 34 encounter the road, they are subjected to tendencies to go out of caster and camber, and these deviations are yieldably resisted, not only by the contractile springs 100, but also by the compression springs 86, as the rock arms 64 are pivoted on the T-shaped members 56, and the slide rods move in related directions through the openings of the cross heads 60, of the members 56, thereby reducing wear upon the suspension joints, and, at the same time, tending to restore and maintain the established toe-in and toe-out of the wheels, thereby reducing wear upon the king-pin assemblies and preserving the alignment of the wheels, and preserving the caster and camber of the wheels 34.

Adjustment of the nuts 82 for either relaxing or tensioning the compression springs 86, are provided for, in order that the stabilizers S may be adjusted to assume correct initial relationships to the lower control arms 18 and wheel backing plates, and to provide the necessary tensions of the springs to counteract deviations of the wheels.

In FIGURE 5 is shown a stabilizer S', especially adapted for use with heavy vehicles and trucks. In this arrangement, a third or middle contractile spring 104 is provided, which is secured, at its outer end, to a third or middle ear 106, affixed to the wheel backing plate. At its inner end, the middle spring 104 is secured to the outer end of a middle eye-bolt 108, which extends through the head 110 of the pivot bolt 59'. The third or middle spring 104 serves to strengthen the actions of the other contractile springs 100, through providing greater resistance to outward swings of the bottoms of the wheels 34, and to provide greater inward pull which tends to right the wheels and restore their caster and camber. Components of the stabilizer S', corresponding to those of FIGURES 1 to 4, are given the same designating numerals, primed.

What is claimed is:

1. For use with vehicles having a chassis with a cross member extending widthwise of and connected to said chassis, said cross member having a wheel backing member pivoted adjacent one end thereof for steering movement relative to said cross member; a stabilizer comprising a base member secured to said cross member inwardly from said wheel backing member and having at least a portion extending outwardly from the connection; an arm substantially medially pivoted to the outer end of said base member; rods pivoted adjacent the ends of said arm and slidably received in the inner end of said base member; compression springs on said rods mounted between said arm and said base to resist tilting of said arm about said pivot and tension springs connecting said arm to said wheel backing member.

2. The stabilizer according to claim 1 in combination with an upper springing arm and a lower springing arm, pivotable to said cross member, said upper and lower springing arms being pivotally connected by a vertical link, said link being secured to said wheel backing member pivoted for steering movement relative to said link and said arms, the base member of said stabilizer being secured to the lower springing arm and the tension springs of said stabilizer being connected to the wheel backing member.

3. The combination of claim 1, wherein said stabilizer is a T-shaped form having a standard portion extending lengthwise of the chassis cross member and a head on the inner end of the standard portion extending crosswise of the cross member, said head being connected to said chassis cross member.

4. The combination of claim 1, wherein the said stabilizer and said arm are horizontally disposed and are located beneath the chassis cross member.

5. The combination of claim 2, wherein said stabilizer is a T-shaped form having a standard portion extending lengthwise of the lower springing arm and a head on the inner end of the standard portion extending crosswise of the lower control arm, said head being connected to said lower springing arm.

6. The combination of claim 2, wherein the said stabilizer and said rock arm are horizontally disposed and are located beneath the lower springing arm.

7. A stabilizer of the character described, comprising a T-shaped lever having a standard portion and a transverse head, said head being formed with bores at its outer ends, rods sliding through said bores, coil springs on the rods and compressed between the head and parts of the rods, a transverse rock arm pivoted intermediate its ends on said standard portion, the rods being pivoted at related ends to the rock arm, and contractile springs secured at one end to the ends of the rock arm.

8. The stabilizer of claim 7, wherein said parts of the rods comprise spring tension adjusting nuts, and the rods have clevises embracing the rock arm, and pivots traversing the clevises and the rock arm.

9. The stabilizer of claim 7, wherein a pivot traverses said standard portion and the middle of the rock arm, and a middle contractile spring is secured at one end to said pivot.

References Cited

UNITED STATES PATENTS

| | | | |
|---|---|---|---|
| 1,468,448 | 9/1923 | Johnson | 280—94 |
| 1,640,388 | 8/1927 | Williams | 280—94 |
| 2,846,234 | 8/1958 | Steinkamp et al. | 280—96.2 |
| 2,993,704 | 7/1961 | Worsham | 280—94 XR |
| 3,075,785 | 1/1963 | Crook | 280—94 |

RICHARD J. JOHNSON, *Primary Examiner.*

L. D. MORRIS, *Assistant Examiner.*